Patented Mar. 18, 1952

2,589,330

UNITED STATES PATENT OFFICE 2,589,330

ANTICAKING AGENT FOR CLEANSING POWDER

Purdy Bradford, Palos Park, and Herman J. White, Lansing, Ill., assignors to Swift & Company, Chicago, Ill., a corporation of Illinois No Drawing. Application August 5, 1948, Serial No. 42,743

6 Claims. (Cl. 252—140)

This invention relates to mixtures of a powdered detergent and an abrasive, and more particularly to cleansing powders having therein trisodium phosphate and silica.

Cleansing powders containing trisodium phosphate and silica are well known, and such powders have been subject to caking under most normal atmospheric conditions and are thereby rendered difficult to remove from a package, and particularly from packages having relatively small openings through which the powder is dispensed.

It is an object of this invention to provide a powdered mixture with an improved anti-caking agent that will completely prevent caking and maintaining the powder in a fluent state whereby it will be readily removed or dispensed from a container.

It is a further object of this invention to provide a powdered mixture with an anti-caking agent capable of maintaining the mixture in a non-caking condition, even when present in very small amounts.

Another object of this invention is to provide a powdered mixture containing silica and an alkali salt having water of crystallization therein which, after prolonged storage, may be readily dispensed from a container.

Other objects of the invention will be apparent from the description and claims to follow.

It is generally believed that powders containing trisodium phosphate and silica are subject to caking because of the formation of sodium silicate. And, as is well known, sodium silicate is an efficient adhesive the formation of which in a cleansing powder would bond the particles together into a solid mass not suitable for being readily dispensed from a container having small discharge openings therein. The sodium silicate is thought to be the result of a reaction between silica and the sodium of the alkali salt in the presence of moisture. As the alkali salt trisodium phosphate contains several molecules of water of crystallization, there may be present a sufficient amount of moisture to cause the objectionable reaction to take place even when moisture from the atmosphere is excluded. The latter is of considerable importance, since it explains the relative ineffectiveness as anti-caking agents for the instant powdered mixtures of those compounds which act simply to prevent the absorption of moisture from the atmosphere by the deliquescent substances. Thus, while the use of the latter type of anti-caking agents might have some effect in preventing caking where deliquescent substances are present, they do not prevent the type of caking which is the result of the aforesaid chemical reaction.

The applicants have discovered that an anti-caking agent comprising finely divided metallic magnesium or magnesium salts will very effectively prevent caking of trisodium phosphate and silica mixtures. It has been found that magnesium compounds in general, including magnesium phosphates, oxides, stearates, nitrates, sulphates, chlorides, palmitates, oleates, as well as powdered magnesium metal, have superior anti-caking properties for the mixtures employed in the present invention.

While the magnesium compositions in general are superior to the non-moisture absorbent anti-caking agents and to the chemical anti-caking agents, such as certain aluminum compounds, applicants particularly prefer to employ magnesium oxide because of its unexpected remarkable anti-caking qualities in a trisodium phosphate and silica mixture. Applicants have discovered that as little as 0.1 per cent magnesium oxide will very effectively prevent the caking of mixtures comprised substantially of finely divided silica and trisodium phosphate in all states of fineness. It has also been found that all grades of magnesium oxide may be employed as anti-sticking agents. Thus, applicants have employed the following magnesium oxides to completely prevent caking of the aforesaid mixtures: "U. S. P. magnesium oxide-light," "C. P. magnesium oxide," and calcined magnesite. While as little as 0.1 per cent "U. S. P. magnesium oxide-light" will effectively prevent caking, it has been found desirable to employ slightly larger amounts of the heavier grades of magnesium oxides. For example, 0.2 per cent of calcined magnesite has been found to effectively prevent caking of the aforesaid mixtures. Larger amounts have no deleterious effect on the entire mixture and do not detract from the cleansing efficiency of the product but, on the contrary, appear to impart a lubricating property to the mixture which improves its overall effectiveness. Thus, in some instances it has been found desirable to employ 1 per cent magnesium oxide as an anti-caking agent. In other instances as much as 5 per cent of the anti-caking agent may be employed.

In addition to the above-mentioned magnesium oxide compound, the other magnesium compounds previously cited have been employed in similar proportions and have proved to be very effective as anti-caking agents when employed between approximately 0.5 per cent and 5 per cent. In addition to the particular magnesium compounds set forth heretofore, magnesium carbonate has also been found to be effective as an anti-caking agent. The quantity of the carbonate necessary to prevent caking, however, is somewhat greater than the required minimum amounts of the other compounds.

In evaluating the effectiveness of the various anti-caking compositions, various mixtures were exposed to an accelerated caking test in which the powdered ingredients were placed in a shallow porcelain evaporating dish and placed in an oven maintained at 140° F. at a relative humidity of 70 per cent for a period of 16 hours. On cooling to room temperature the contents of each dish was discharged and examined for hard crystalline masses or lumps. As an alternative method, the samples of cleanser were heated in a chamber maintained at a constant humidity of 87 per cent for a period of 3 hours and then transferred to a sieve and shaken in a mechanical shaker for 2 minutes. The weight of the residue on the sieve was taken as a measure of the caking tendency of the cleanser. Each of the above tests is applicable to the present mixtures.

To further illustrate the present invention, the following specific examples are set forth:

Example I

20% trisodium phosphate
79.9% silica
0.1% magnesium oxide—U. S. P., light

The powdered ingredients were intimately mixed and a portion of the mixture subjected to the 16-hour caking test previously described. No objectionable caking was observed.

Example II

20% trisodium phosphate
79.8% silica
0.2% calcined magnesite

The powdered ingredients were intimately mixed and 30 grams of the resulting mixture subjected to the above-described 3-hour caking test. The amount of residue after the completion of the said test was less than 0.1 gram and was considered negligible.

Example III

22% trisodium phosphate
77% silica
1% calcined magnesite

The powdered ingredients were intimately mixed and 30 grams of the mixture subjected to the 3-hour caking test, wherein a residue of approximately 0.2 gram was considered negligible.

Example IV

20% trisodium phosphate
78% silica
2% magnesium powder

The powdered ingredients were intimately mixed and a portion of the mixture subjected to the said 16-hour caking test. No objectionable caking was observed.

Example V

20% trisodium phosphate
77% silica
3% magnesium stearate

The powdered ingredients were intimately mixed and a portion of the mixture subjected to the 16-hour caking test. No objectionable caking was observed.

While the foregoing description has referred particularly to trisodium phosphate as the alkali salt present in combination with the silica, it is to be understood that other alkali metal phosphate salts and other caustic alkali detergent compounds are within the scope of applicants' invention. Also the abrasive composition employed by applicants should not be restricted to silica, since silica-containing mixtures, such as feldspar, are also within the purview of the present invention.

It should be obvious that various modifications will suggest themselves to those skilled in the art, and it should be understood that such modifications may be made without departing from the spirit and scope of this invention.

We claim:

1. A substantially non-caking cleansing powder consisting essentially of finely divided trisodium phosphate, particles of silica as an abrasive, and an amount from 0.1 to about 3 percent of a powdered anti-caking agent selected from the group consisting of metallic magnesium and compounds thereof.

2. A composition substantially as described in claim 1 wherein the anti-caking agent is powdered magnesium sulfate.

3. A composition substantially as described in claim 1 wherein the anti-caking agent is magnesium stearate.

4. A composition substantially as described in claim 1 wherein the anti-caking agent is magnesium oxide.

5. A composition substantially as described in claim 1 wherein the anti-caking agent is magnesium chloride.

6. A composition substantially as described in claim 1 wherein the anti-caking agent is magnesium metal.

PURDY BRADFORD.
HERMAN J. WHITE.

REFERENCES CITED

The following references are of record in the file of this patent:

UNITED STATES PATENTS

| Number | Name | Date |
| --- | --- | --- |
| 2,130,869 | Block et al. | Sept. 20, 1938 |
| 2,257,545 | Curtis | Sept. 30, 1941 |
| 2,275,049 | Keller | Mar. 3, 1942 |
| 2,385,075 | Gunther | Sept. 18, 1945 |